Nov. 20, 1951     T. J. KNIGHT     2,575,419
MULTIPLE SWING FARM GATE
Filed Nov. 28, 1947     2 SHEETS—SHEET 1
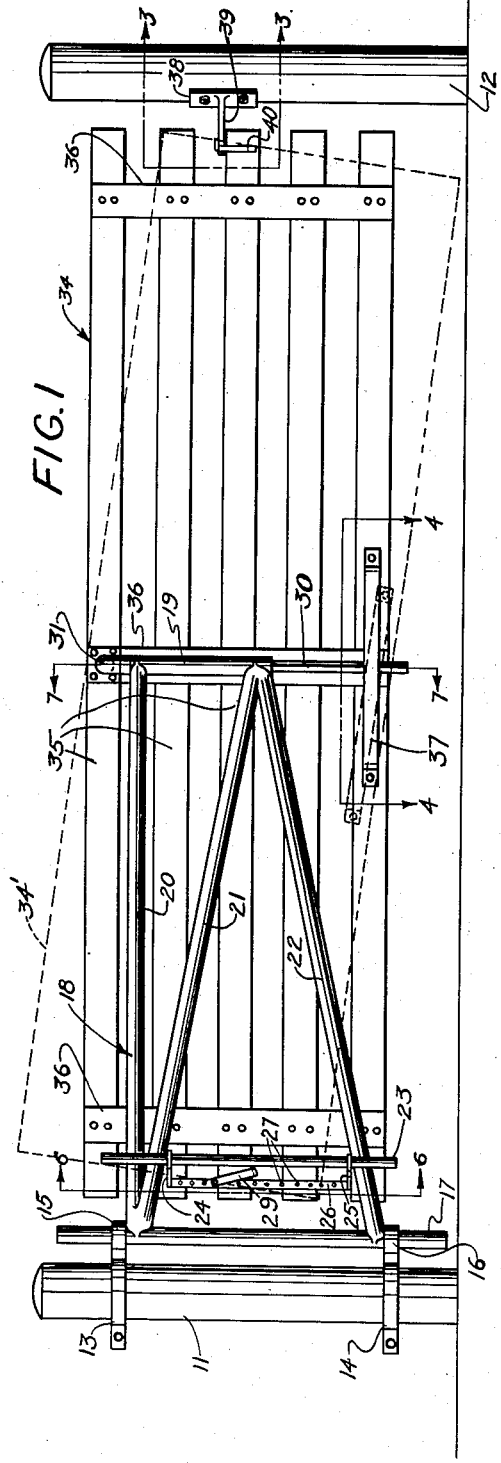
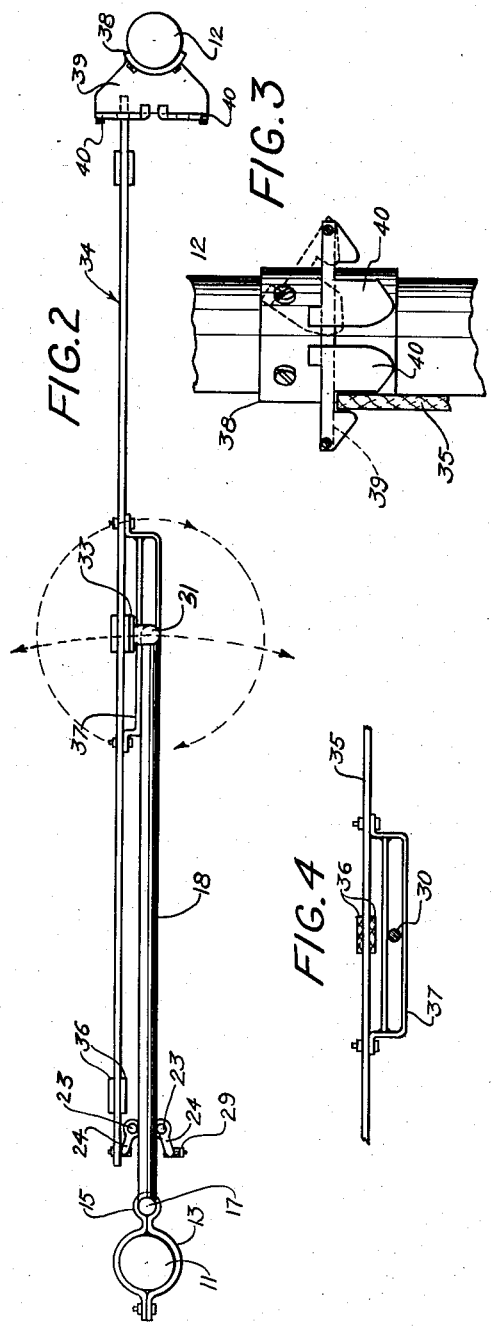
INVENTOR.
TROY J. KNIGHT
BY
McMorrow, Berman + Davidson
Attorneys

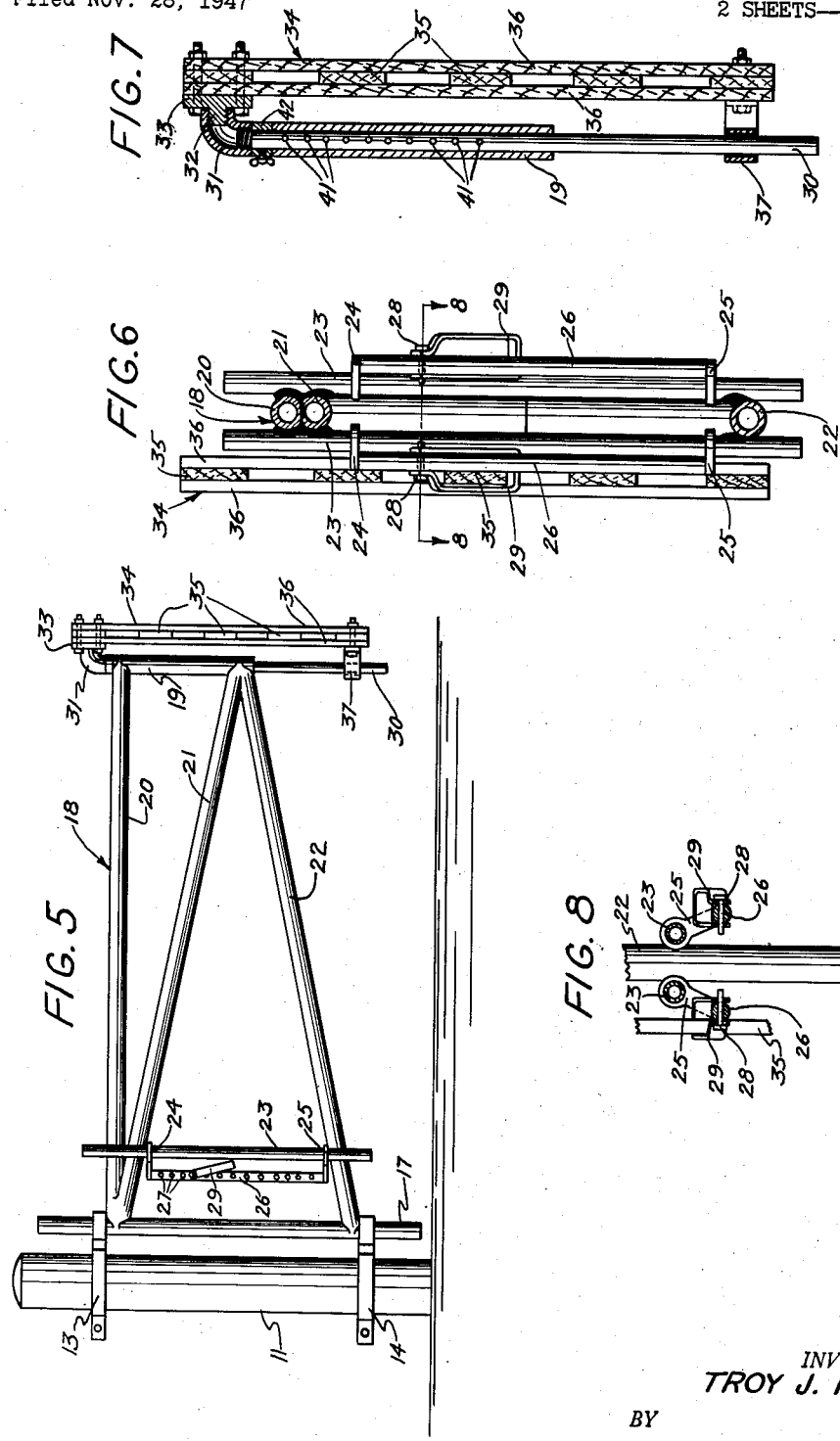

Patented Nov. 20, 1951

2,575,419

UNITED STATES PATENT OFFICE 2,575,419

MULTIPLE SWING FARM GATE

Troy J. Knight, Golden, Ill.

Application November 28, 1947, Serial No. 788,597

1 Claim. (Cl. 39—78)

This invention relates to farm gates and more particularly to a farm gate of the multiple adjustment type which is especially adapted to facilitate the movement of cattle or other stock into and out of a farm enclosure or field.

A main object of the new invention is to provide a novel and improved farm gate which has multiple types of adjustment in accordance with different requirements as to size of the passageway desired, depending upon the size and number of the stock passing through the gate, the gate being very simple in construction and easy to install and operate.

A further object of the invention is to provide an improved farm gate of the multiple adjustment type which is inexpensive to build, sturdy in construction, and which is swingable in a horizontal plane, to allow large cattle to pass through the gate and which may be adjusted angularly in a vertical plane to allow small stock animals such as pigs, and the like, to pass under the gate.

Further objects and advantages of the invention will become apparent from the following description and claim, and from the accompanying drawings, wherein:

Figure 1 is an elevational view of a stock gate constructed in accordance with the present invention.

Figure 2 is a top view of the gate shown in Figure 1.

Figure 3 is an enlarged detail view of the latch structure employed on the gate, said view being taken on line 3—3 of Figure 1.

Figure 4 is a detail view taken on line 4—4 of Figure 1.

Figure 5 is an elevational view of the gate of Figure 1, showing the body of the gate rotated around its intermediate vertical axis to an open position and illustrating one type of the possible modes of operation of the gate.

Figure 6 is an enlarged cross-sectional detail view taken on line 6—6 of Figure 1.

Figure 7 is an enlarged cross-sectional detail view taken on line 7—7 of Figure 1.

Figure 8 is a cross-sectional detail view taken on line 8—8 of Figure 6.

Referring to the drawings, 11 designates a vertical post suitably anchored in the ground at one side of the passageway leading to the farm enclosure or field, and 12 designates a similar post anchored in the ground at the other side of the passageway. Secured to post 11 are respective upper and lower brackets 13 and 14, said brackets being formed with the respective vertically aligned eye portions 15 and 16. Journaled in said eye portions 15 and 16 is a vertical spindle member 17. Spindle member 17 forms part of a frame 18, said frame comprising spindle member 17, a vertical sleeve 19, and cross bars 20, 21 and 22 rigidly connecting sleeve 19 to spindle member 17 and extending substantially half way across the passageway between the posts 11 and 12.

Secured to the crossbars 20, 21 and 22 on both sides thereof adjacent the spindle member 17 are vertical bars 23, 23, and secured to each bar 23 by respective top and bottom lugs 24 and 25 are vertical apertured bars 26, 26. Each bar 26 has a plurality of vertically spaced apertures 27, and secured to each bar 26 by a removable pin 28 passing through a selected aperture 27 is a clevis member 29.

Slidably and rotatably carried in the sleeve member 19 is a vertical shaft or spindle member 30 having threaded to its top end an elbow 31. Threaded into and rotatable in the horizontal leg of elbow 31 is a stud 32 carrying a vertical plate element 33. Secured to said plate element 33 is the top intermediate portion of the gate body 34. Said gate body comprises vertically spaced horizontal bars 35 connected by spaced vertical bars 36. Secured to shaft 30 subadjacent the bottom rim of elbow 31 is a collar 42 which rotatably bears on the top end of sleeve member 19 and provides the main support for gate body 34 on the frame 18.

Secured to the intermediate portion of the lowermost horizontal bar 35 of gate body 34 is a longitudinally slotted bracket 37 which receives the lower end portion of shaft 30, the bracket 37 being relatively elongated longitudinally to allow swinging adjustment of the gate body 34 around the stud 32 to desired angular positions of said gate body, as shown, for example, in dotted view at 34' in Figure 1. An end of one of the horizontal bars 35 is engaged in one of the clevis members 29 to secure the gate body 34 in the selected angular position thereof. Figure 1 shows in full line view the gate body 34 secured by a clevis member 29 in horizontal position.

Post 12 has secured to its intermediate portion a bracket 38. Pivoted to opposed ends of an inwardly projecting horizontal flange 39 carried by said bracket are the respective notched latch members 40, 40. The notched latch members 40 are each adapted to engage over an end portion of an adjacent horizontal bar 35 to latch the gate in closed position. By rotating the latch member 40 upwardly, as shown in dotted line view in Figure 3, the gate may be released for swinging movement.

The gate body is secured in an inclined position, such as shown at 34', when it is desired to provide clearance for the passage of small animals such as pigs, or the like, under the raised lower portion of the gate body.

When it is desired to provide clearance through the passageway for larger animals, the latch 40 is released and the gate is swung bodily to open position around the spindle member 17. When it is desired to provide only half of the maximum clearance, the clevis 29 engaging the end of a horizontal bar 35 is removed, allowing the gate body 34 to be swung to the position shown in Figure 5.

By the provision of the plurality of apertures 27 in the bars 26 close vertical adjustments of the clevis members 29 may be obtained.

By the provision of the duplicate bars 23, 26 and latch members 39 on both sides of the plane of frame 18, the gate body may be secured on either one side or the other of said plane. Since shaft member 30 is vertically slidable in sleeve 19, the gate body 34 may be freely elevated with respect to the frame 18. Vertically spaced apertures 41 are formed in shaft member 30, through which a pin may be transversely passed to support the shaft member on the top rim of sleeve 19 in a desired elevated position of the gate body.

While a specific embodiment of a multiple adjustable farm gate has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a swingable gate, a fixed vertical post, a vertical frame pivotally secured at one end to said post for horizontal swinging movement about a vertical axis, a vertical sleeve carried by the other end of the frame, a rod journalled in said sleeve and projecting downwardly therefrom, a right angular tubular extension on the upper end of the sleeve, a medially hinged sectional gate, a pivot member projecting laterally from the upper central portion of the gate and journalled in the extension, a longitudinally slotted bracket secured to the lower central portion of the gate and receiving the lower end of the rod whereby the gate is centrally mounted on the frame for vertical swinging movement about a horizontal axis, a mounting member on said frame adjacent the fixed vertical post, a clevis carried by said member and vertically adjustable thereon, said clevis lockingly engaging one section of the gate and means for locking the other section of the gate so that the gate is locked in a closed position.

TROY J. KNIGHT.

REFERENCES CITED

The following references are of record in the file of this patent:

UNITED STATES PATENTS

| Number | Name | Date |
|---|---|---|
| 66,778 | Beardsley | July 16, 1867 |
| 439,005 | Hathaway | Oct. 21, 1890 |
| 502,206 | Russell | July 25, 1893 |
| 579,319 | Denis | Mar. 23, 1897 |
| 594,030 | Mitchell | Nov. 23, 1897 |
| 629,360 | Hathaway | July 25, 1899 |
| 698,717 | Larimore | Apr. 29, 1902 |